United States Patent [19]

Bourrieres

[11] Patent Number: 4,701,577

[45] Date of Patent: Oct. 20, 1987

[54] CABLE SUPPORT FOR AN ELECTRIC POWER-LINE POLE

[75] Inventor: Pierre Bourrieres, Cahors, France

[73] Assignee: Manufacture d'Appareillage Electrique de Cahors, Cahors, France

[21] Appl. No.: 865,768

[22] Filed: May 22, 1986

[30] Foreign Application Priority Data

May 28, 1985 [FR] France ................................ 85 07954

[51] Int. Cl.⁴ ......................... H02G 7/20; E04H 12/22
[52] U.S. Cl. ..................................... 174/45 R; 52/40; 174/168; 248/219.2
[58] Field of Search ............... 174/40 R, 45 R, 149 R, 174/168, 174; 52/40, 300, 697, 721; 248/219.2

[56] References Cited

U.S. PATENT DOCUMENTS 41,157  1/1864  Holland ............................... 174/174

FOREIGN PATENT DOCUMENTS 1035391  4/1953  France ................................ 174/168
1145447  5/1957  France ................................ 174/45 R
493978  5/1954  Italy ........................................ 52/40
278737  2/1952  Switzerland ....................... 174/45 R Primary Examiner—Laramie E. Askin
Attorney, Agent, or Firm—Young & Thompson

[57] ABSTRACT

A cable support for an electric power-line pole comprises a body of insulating material having a core delimited externally by a substantially rigid shell to which are attached individual cable support brackets. The core is covered with an insulating membrane with interposition of packing material.

11 Claims, 2 Drawing Figures

CABLE SUPPORT FOR AN ELECTRIC POWER-LINE POLE

BACKGROUND OF THE INVENTION

1. Field of the Invention

The present invention relates to a cable support for an electric power-line pole, comprising a body of insulating material having a core on which are mounted individual cable support brackets, the cable support being also provided with means for attaching the body to one end of a pole whilst means for securing the individual cable support brackets to the core are embedded in packing material.

2. Description of the Prior Art

A known cable support of this type has been disclosed in French Pat. No. FR-A-1,035,391. Insulating supports of this type which are attached to the end of a pole have the advantage of dispensing with the need for individual insulators and of permitting manufacture of these supports independently of the pole.

However, it is apparent that the body of insulating material is both costly and difficult to manufacture since it calls for a substantial mass of plastic material having high characteristics of mechanical strength, arcing resistance, resistance to aging, and so on.

SUMMARY OF THE INVENTION

The object of the present invention is to propose a cable support which is more economical to produce.

In accordance with the invention, the distinctive feature of the cable support lies in the fact that the core is delimited externally by a substantially rigid shell to which are attached the individual cable support brackets and that the core is covered with an insulating membrane with interposition of packing material.

Thus the core and in particular the shell which contributes a substantial proportion of the mechanical strength of the support as a whole are protected by the insulating membrane. They do not need to provide any particular resistance to aging by contact with the external medium or any particular resistance to arcing. It is precisely the object of the insulating membrane to carry out these functions. The packing material not only protects and if necessary locks the attached individual support brackets in position but also serves to attenuate any surface irregularities resulting from this attachment to the shell and therefore enables the membrane to be in intimate contact with the subjacent material at all points without any attendant danger of detachment.

Preferably, the surface of the packing material which is in contact with the membrane is provided with wavy corrugations corresponding to the outer surface of the membrane. Said membrane thus has a corrugated shape which increases the arcing distance between two individual support brackets.

The shell can be of frusto-conical shape. It is thus possible to mount the same cable support on poles having different dimensions by cutting the central body at the level at which this latter has a transverse dimension corresponding to the dimension of the pole on which it is to be mounted.

The individual support brackets can comprise a base plate applied against the shell by adhesive bonding whilst fibers or filaments can be wound around the base plate and the shell in order to strengthen the attachment.

In another embodiment, the individual cable support brackets each comprise a rod extending radially through the shell within an insulating support tube interposed between a shouldered portion of the individual cable support bracket and a nut or the like applied against an annular flange of said tube, said flange being in turn applied against the external surface of the shell on the side opposite to the shouldered portion which is adjacent to a head of the individual support bracket.

According to an advantageous aspect of the invention, the means for attaching the body to one end of a pole comprise an annular spacer member which is engaged with the shell in force-fitting relation thereto.

Thus, by making use of spacer members available in a wide range of different sizes, the cable support can readily be adapted to poles of different shapes while manufacturing only a single type of body. This arrangement also makes it possible to reduce the cable support stocks which are necessary in order to meet replacement requirements for different types of poles.

According to another advantageous aspect of the invention, the means for attaching the central body make it possible to orient the cable support on the end of the pole around the axis of said pole. Thus the cable support can readily be oriented after positioning on the pole and in such a manner as to ensure that the individual cable support brackets are exactly in alignment with the cables to be supported.

BRIEF DESCRIPTION OF THE DRAWINGS

Other features of the invention will be more apparent to those skilled in the art upon consideration of the following description and accompanying drawings, wherein.

DESCRIPTION OF THE PREFERRED EMBODIMENTS

Figure 1:
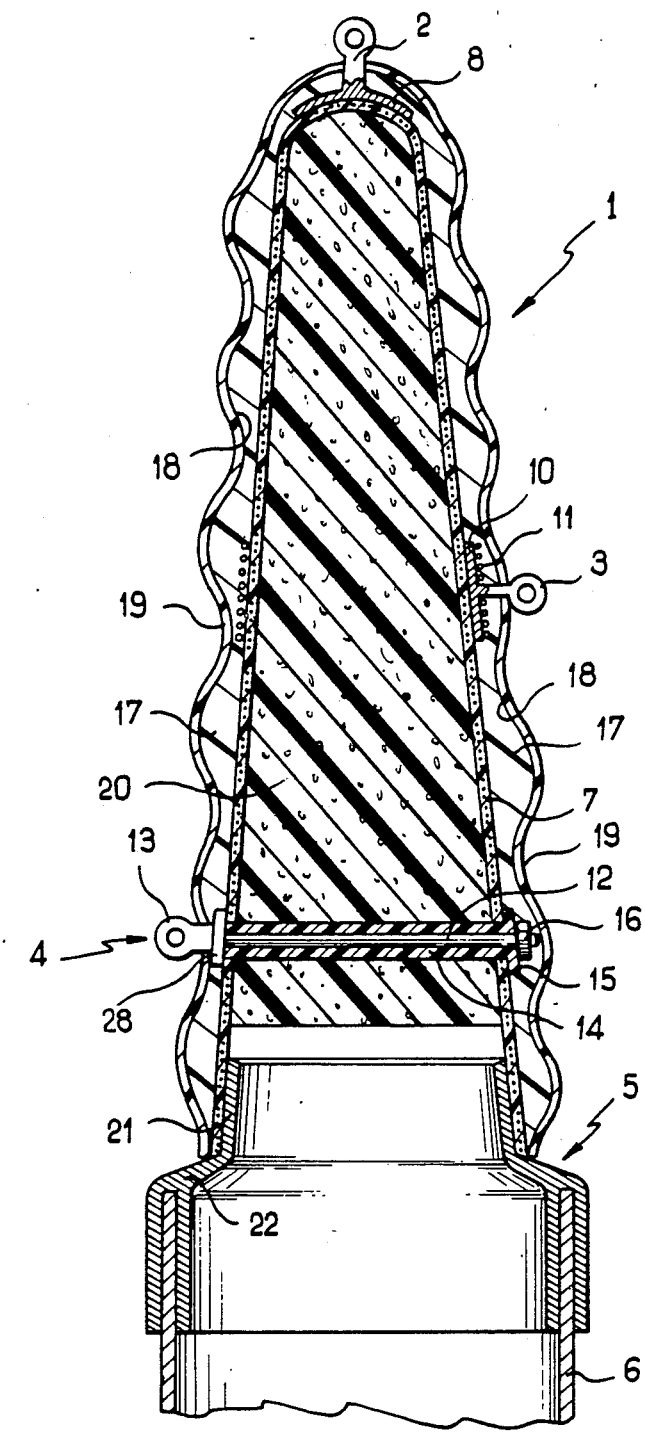
FIG. 1 is a longitudinal sectional view of a first embodiment of the invention.

With reference to FIG. 1, the cable support for an electric power-line pole in accordance with the invention comprises a central body designated by the general reference 1. On said body are mounted individual cable support brackets (2, 3, 4) and means formed by a spacer member 5 for attaching the central body 1 to the upper end of a pole 6.

In this first embodiment, the central body 1 comprises a hollow central shell 7 which is closed at the upper end, said shell being formed of filament material embedded in a resin. By way of example, the central shell 7 is formed by winding a filament on a mandrel which preferably consists of a frusto-conical mandrel having a circular base. The technique of fabrication of a hollow body by filament winding is well-known per se and consequently does not need to be described in detail.

The fibers of filament material extend in a general tangential direction which forms an acute angle (not a right angle) with the axis of the shell 7. Furthermore, the shell can be reinforced with longitudinal fibers which are also embedded in the resin. By way of example, the longitudinal fibers form part of a woven fabric element which is positioned around the shell between two filament winding layers.

In the embodiment considered by way of example and illustrated in FIG. 1, the individual cable support bracket 2 is attached to the upper end of the cable support, thus making it possible to reduce problems of twist in the central shell and, in the case of a threecable support as illustrated, to distribute the individual cable support brackets on the central body in a symmetrical manner.

The lower portion of the individual cable support 2 is provided with a base plate 8 which is adhesively bonded to the central shell 7.

Similarly, the individual cable support bracket 3 also has a base plate 10 which conforms substantially to the shape of the lateral surface of the shell 7 and is bonded to this latter by adhesion. In order to increase the strength of the connection between the plate 10 and the central shell 7, fiber filaments 11 are preferably wound around the shell 7 and the plate 10 after this latter has been placed in position.

The individual cable support bracket 4 comprises a rod 12 which is rigidly fixed to the support head 13 and extends transversely to the shell 7 within an insulating support tube 14 having an annular flange 15 which is applied against the external surface of the shell 7. At the end remote from the support head 13, the rod 12 is threaded and held in position by a nut 16 which is applied against the flange 15 and clamps the tube 14 against an annular flange 28 which forms a shoulder on the rod 12 externally of the shell 7 on the side corresponding to the head 13. The length of the tube 14 is preferably equal to the transverse dimension of the shell 7. By tightening the nut 16, it is thus possible to fix the individual cable support bracket 4 securely in position without exerting any compressive stress on the shell 7.

Although different modes of attachment of the individual cable support brackets have been described with reference to the same figure for the sake of convenience of the description, it will be understood that the individual cable support brackets can all be fixed on the central body by making use of the same type of attachment means.

The shell 7 is covered with a packing resin layer 17 having an external surface 18 which forms wavy corrugations. The packing resin thus has the effect of increasing the arcing distance between the individual cable support brackets. The packing resin 17 is covered with a membrane 19 which preferably consists of silicone resin and has the function of protecting the central body against electric arcs, against the aging effect of ultraviolet radiation and against penetration of water.

In order to increase the rigidity of the central body 1, this latter is preferably filled up to at least part of its height with a core material 20 such as an expanded resin, for example.

The spacer member 5 has an annular skirt 21, the external dimension of which is substantially equal to the internal dimension of the shell 7. The open lower end of the shell is engaged and fixed on the annular skirt 21, for example by adhesive bonding. The spacer member 5 has a tulip-shaped lower portion 22 which provides a connection with the electric power-line pole 6.

In the case of FIG. 1, the power-line pole 6 is of hollow design and the lower portion of the spacer member 5 preferably has a double wall which is tightly applied against the power-line pole 6 both internally and externally.

Figure 2:
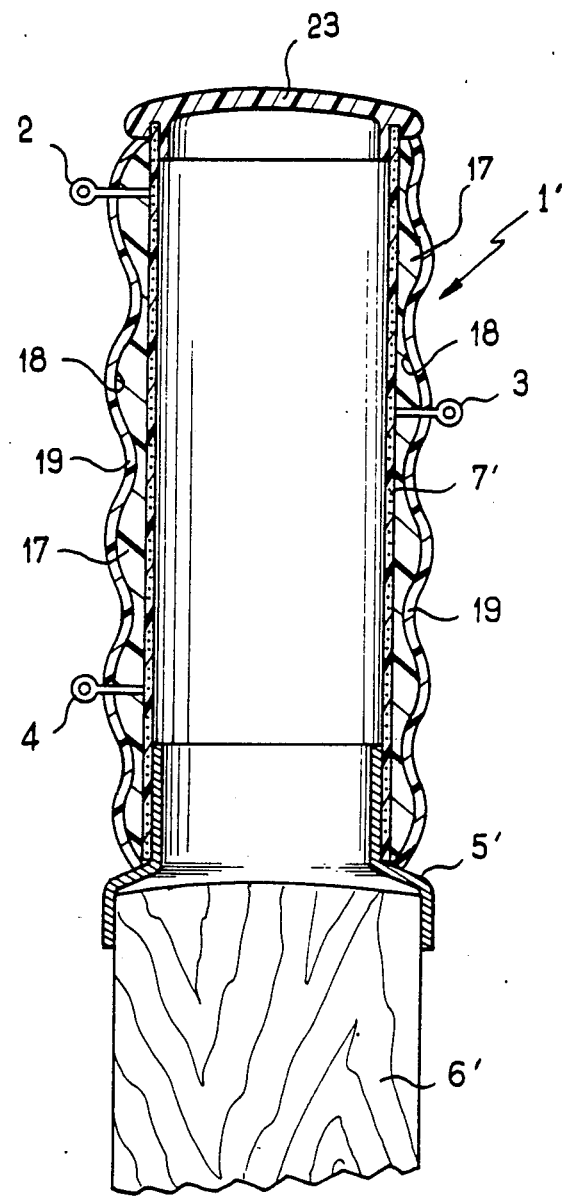
FIG. 2 is a longitudinal sectional view of a second embodiment of the invention.

FIG. 2 illustrates another embodiment of the invention in which the central shell 7' is cylindrical and is closed by a top end-cap 23. In this embodiment, the individual cable support brackets 2, 3, 4 shown diagrammatically in this figure are arranged at intervals only on the sides of the central body 1'. Depending on requirements, the support brackets 2, 3, 4 are fixed in accordance with either of the two modes of attachment illustrated in FIG. 1.

As in the previous case, the shell 7' is covered with a packing resin layer 17 which is in turn covered with a membrane 19 of silicone resin. In this embodiment, the pole 6' is of wood and the lower portion of the spacer member 5;has only one wall which is force-fitted over the outer surface of the pole 6'.

As will readily be apparent, the invention is not limited to the embodiments described in the foregoing and alternative forms of construction may accordingly be contemplated.

In particular, the spacer member can be fitted externally on the central body and the pole in the same manner as a sleeve.

In order to prevent any penetration of moisture into the pole, provision can also be made for a sleeve of heat-shrinkable plastic material placed over the connecting portion between the central body 1,1' and the pole 6,6'.

Although the embodiments describe,d in detail in the foregoing comprise a spacer member 5,5' in each instance, steps may be taken to fit the central body 1,1' directly on the upper end of the pole 6,6'. Similarly, the central body 1,1' may have a non-circular cross-section such as, for example, a cross-section adapted to the cross-section of the pole on which the shell is intended to be mounted.

What is claimed is:

1. A cable support for an electric power-line pole, comprising a body of insulating material having a core on which are mounted individual cable support brackets, the cable support being also provided with means for attaching said support to one end of a pole whilst fixing means for securing the individual cable support brackets to the core are embedded in packing material wherein the core is delimited externally by a substantially rigid shell to which are attached the individual cable support brackets and wherein the core is covered with an insulating membrane with interposition of said packing material.

2. A cable support according to claim 1, wherein the surface of the packing material which is in contact with the membrane is provided with wavy corrugations corresponding to the outer surface of said membrane.

3. A cable support according to claim 1, wherein the shell comprises filament material wound in a tangential direction and embedded in a resin.

4. A cable support according to claim 1, wherein the shell is of frusto-conical shape.

5. A cable support according to claim 1, wherein the core contains within the shell packing material up to at least part of its height.

6. A cable support according to claim 1, wherein at least one of the individual cable support brackets comprises a base plate applied against the shell by adhesive bonding.

7. A cable support according to claim 6, wherein fiber-type filaments are wound around the base plate and the shell.

8. A cable support according to claim 1, wherein at least one of the individual cable support brackets comprises a rod extending radially through the shell within an insulating support tube interposed between a shouldered portion of the individual cable support bracket and a nut applied against an annular flange of said tube, said flange being in turn applied against the external surface of the shell on the side opposite to the shouldered portion which is adjacent to a head of the individual cable support bracket.

9. A cable support according to claim 1, wherein the means for attaching the body to one end of a pole comprise an annular spacer member which is engaged with the shell in force-fitting relation thereto.

10. A cable support according to claim 1, wherein the means for attaching the cable support make it possible to orient the cable support on the end of the pole around the axis of said pole.

11. A cable support according to claim 1 wherein the shell comprises longitudinally extending fibers embedded in a resin.

* * * * *